United States Patent
Yamaguchi et al.

(10) Patent No.: US 8,448,168 B2
(45) Date of Patent: May 21, 2013

(54) RECORDING MEDIUM HAVING VIRTUAL MACHINE MANAGING PROGRAM RECORDED THEREIN AND MANAGING SERVER DEVICE

(75) Inventors: Hiroyuki Yamaguchi, Kawasaki (JP); Takashi Maeda, Kawasaki (JP); Yuta Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 12/408,008

(22) Filed: Mar. 20, 2009

(65) Prior Publication Data

US 2009/0249333 A1 Oct. 1, 2009

(30) Foreign Application Priority Data

Mar. 28, 2008 (JP) .................................. 2008-88341

(51) Int. Cl.
 G06F 9/455 (2006.01)
 G06F 9/46 (2006.01)
(52) U.S. Cl.
 USPC .............................. 718/1; 718/104; 718/105
(58) Field of Classification Search
 USPC ............................................................ 718/1
 See application file for complete search history.

(56) References Cited

U.S. PATENT DOCUMENTS

| 7,203,944 B1 * | 4/2007 | van Rietschote et al. ..... 718/104 |
| 7,716,667 B2 * | 5/2010 | van Rietschote et al. ......... 718/1 |
| 7,925,923 B1 * | 4/2011 | Hyser et al. .................... 714/13 |
| 7,953,574 B2 * | 5/2011 | Arakawa et al. .............. 702/132 |
| 8,156,490 B2 * | 4/2012 | Bozek et al. ...................... 718/1 |
| 2005/0251802 A1 * | 11/2005 | Bozek et al. ...................... 718/1 |
| 2005/0278520 A1 | 12/2005 | Hirai et al. |
| 2007/0130566 A1 * | 6/2007 | van Rietschote et al. ......... 718/1 |
| 2007/0180117 A1 | 8/2007 | Matsumoto et al. |
| 2008/0104587 A1 * | 5/2008 | Magenheimer et al. .......... 718/1 |
| 2009/0106409 A1 * | 4/2009 | Murata ......................... 709/223 |
| 2009/0172125 A1 * | 7/2009 | Shekhar et al. ............... 709/215 |
| 2010/0332657 A1 * | 12/2010 | Elyashev et al. .............. 709/226 |

FOREIGN PATENT DOCUMENTS

| JP | 2000-137692 | 5/2000 |
| JP | 2005-115653 | 4/2005 |
| JP | 2007-179437 | 7/2007 |
| WO | WO 03/083693 | 10/2003 |

OTHER PUBLICATIONS

Notification of Reason for Refusal mailed Mar. 21, 2012 from Japanese Patent Application No. 2008-088341 (with partial English translation).
Website URL:http://www.computerworld.jp/common/print/news/88549 dated Nov. 26, 2007. (Translation available with Live Search).

* cited by examiner

*Primary Examiner* — Jennifer To
(74) *Attorney, Agent, or Firm* — Greer, Burns & Crain, Ltd.

(57) ABSTRACT

A virtual machine managing program manages plural physical machines and makes a computer device execute processing through virtual machines developed on each physical machine. Virtual machines are assigned to physical machines on the basis of CPU usage rate and temperature, and are moved among the physical machines as needed, to maintain acceptable operating conditions.

16 Claims, 7 Drawing Sheets

FIG. 3

| PHYSICAL MACHINE | VIRTUAL MACHINE OPERATING ON PHYSICAL MACHINE |
|---|---|
| PM01 | VM11、VM12、VM13、VM15、VM19 |
| PM02 | VM22、VM26 |
| PM03 | VM31、VM35、VM37、VM39 |
| PM04 | VM43、VM45、VM46、VM47 |
| PM05 | VM51、VM59 |
| PM06 | VM62、VM65 |

FIG. 4

| CHECK TARGET PHYSICAL MACHINE | REFERENCE TEMPERATURE | CPU ENVIRONMENT TEMPERATURE | OVER REFERENCE | MOVEMENT TARGET VIRTUAL MACHINE | MOVEMENT DESTINATION TARGET PHYSICAL MACHINE |
|---|---|---|---|---|---|
| PM01 | 70 | 45 | | | |
| PM02 | 70 | 75 | ✓ | VM22 | PM05 |
| PM03 | 70 | 50 | | | |
| PM04 | 70 | 50 | | | |
| PM05 | 70 | 30 | | | |
| PM06 | 70 | 50 | | | |
| PM07 | 70 | 55 | | | |
| PM08 | 70 | 60 | | | |
| PM09 | 70 | 65 | | | |
| PM10 | 70 | 40 | | | |

RECORDING MEDIUM HAVING VIRTUAL MACHINE MANAGING PROGRAM RECORDED THEREIN AND MANAGING SERVER DEVICE

CROSS-REFERENCE TO RELATED APPLICATION

This application is based upon and claims the benefit of priority of the prior Japanese Patent Application No. 2008-88341, filed on Mar. 28, 2008, the entire contents of which are incorporated herein by reference.

FIELD

An embodiment of the present invention relates to a recording medium having a virtual machine managing program recorded therein, the virtual machine managing program managing physical machines such as a host machine, etc. and making a computer execute processing of managing a virtual machine developed on each physical machine, and a managing server device.

BACKGROUND

There is known a technique for a managing server device in which physical machines such as a host machine, etc. are managed. Plural virtual machines developed on physical machines are managed by using virtualization software, and the plural virtual machines cooperate with one another so that one control processing can be executed.

There is also known a technique for a managing server device in which performance data of each virtual machine developed on a physical machine is measured and a virtual machine is moved onto another physical machine on the basis of the measurement result, so that performance is a maximum (for example, Japanese Patent No. 3861087).

Furthermore, there is also known a technique for a managing server device in which a usage rate of CPU (Central Processing Unit) of a physical machine on which plural virtual machines are developed is measured for every physical machine, and a virtual machine having the highest CPU usage rate is moved and developed onto a physical machine having the lowest CPU usage rate on the basis of the measurement result. The following document discloses such a technique for managing a server device.

According to that managing server device, the CPU usage rate of every physical machine is measured, and the virtual machine having the highest CPU usage rate is moved and developed onto the virtual machine having the lowest CPU usage rate on the basis of the measurement result. However, the operation state of the CPU of the physical machines can become unstable due to a great increase of CPU environmental temperature which is caused by rapid increase of the power consumption amount due to recent enhancement of the processor performance and high-densification of computing environment. Thus, it is difficult to attain a stable operation of not only a physical machine, but also a virtual machine merely by moving and developing the virtual machine on another physical machine with attention only to a usage rate of the CPU of the physical machine.

SUMMARY

According to an aspect of the invention, a virtual machine managing program that manages plural physical machines and makes a computer device manage virtual machines developed on each physical machine makes the computer execute:

a reference level storing procedure of pre-storing a physical event reference level relating to a physical event of the physical machine and a calculator event reference level relating to calculator events of the physical machine and the virtual machine; a physical event detecting procedure of detecting a physical event of the physical machine; a calculator event detecting procedure of detecting calculator events of the physical machine and the virtual machine; a movement target physical machine selecting procedure for selecting a physical machine as a movement target physical machine from the plural physical machines when the physical event of the physical machine concerned, which is detected in the physical event detecting procedure, is above the physical event reference level being stored; a movement target virtual machine selecting procedure for selecting a virtual machine as a movement target virtual machine from virtual machines selected in the movement target physical machine selecting procedure and developed onto the movement target physical machine when the calculator event of the virtual machine concerned which is detected in the calculator event detecting procedure is above the calculator event reference level being stored; and a movement destination physical machine selecting procedure for selecting an optimum physical machine from the plural physical machines on the basis of a detection result of the physical event detecting procedure or the calculator event detecting procedure, and selecting the selected optimum physical machine as a movement destination target physical machine which is a movement destination of the movement target virtual machine selected in the movement target virtual machine selecting procedure.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION of DRAWINGS

FIG. 3 is a diagram illustrating the table content of a virtual machine list table according to the first embodiment;

FIG. 4 is a diagram illustrating the table content of a movement managing table according to the first embodiment;

DESCRIPTION of EMBODIMENTS

Embodiments of a virtual machine managing program and a managing server device according to the present invention will be described in detail with reference to the accompanying drawings. The technical content of these embodiments does not limit the technical scope of the present invention.

First, a summary of an embodiment of the present invention is as follows. When a physical machine whose CPU environmental temperature (physical event) is above a stored reference temperature is selected from plural physical machines, the selected physical machine is selected as a movement target physical machine. When a virtual machine having the highest CPU usage rate (calculator event) is selected from virtual machines developed on the selected movement target physical machine, the selected virtual machine is selected as a movement target virtual machine. A physical machine having the lowest CPU environmental temperature, that is, the optimum physical machine, is selected as a movement destination target physical machine from the plural physical machines, and the movement target virtual machine is moved and developed on the selected movement destination target physical machine. Therefore, the virtual machine can be moved and developed in accordance with the system environment in consideration of not only the CPU usage rate, but also the CPU environmental temperature, whereby not only the physical machine, but also the virtual machine can be stably operated.

First Embodiment

Figure 1:
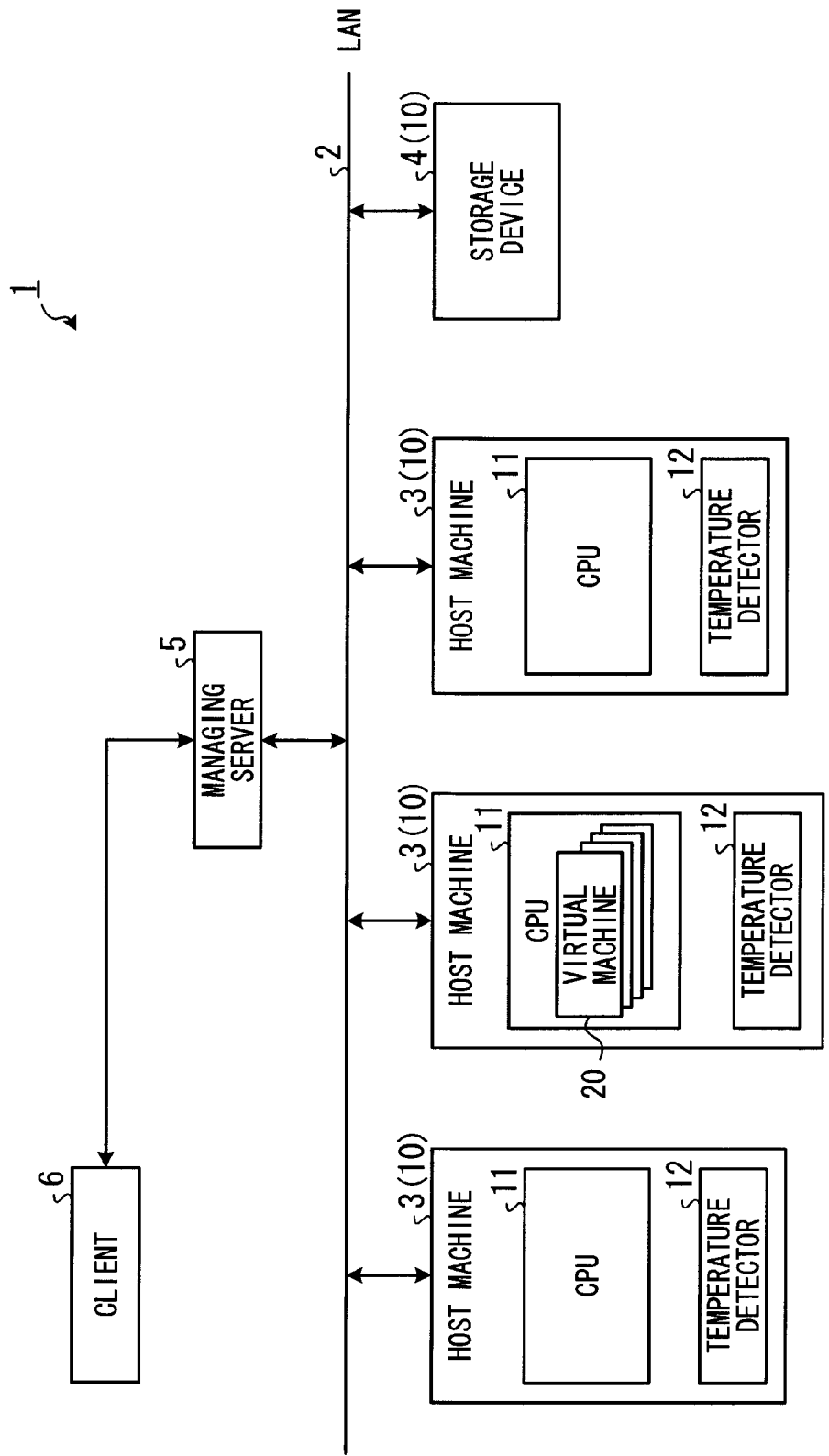
FIG. 1 is a block diagram illustrating the overall construction of a virtual machine managing system according to a first embodiment.

FIG. 1 is a block diagram illustrating the overall construction of a virtual machine managing system according to a first embodiment.

The virtual machine managing system 1 illustrated in FIG. 1 has a managing server 5 for managing plural host machines 3 and a storage device 4 through LAN (Local Area Network) 2, and a client 6 managing the managing server 5. Each host machine 3 has CPU 11 for controlling the whole of the host machine thereof, and a temperature detector 12 for detecting the environmental temperature of CPU 11.

The temperature detector 12 is disposed so as to be adjacent to CPU 11 in a physical machine 10, and directly detects the environmental temperature of CPU 11.

By using virtualization software, CPU 11 in the host machine 3 develops plural virtual machines 20 and makes the plural virtual machines 20 being developed cooperate with one another to execute various kinds of processes.

The managing server 5 manages the physical machines 10 such as the host machines 3, the storage device 4, etc., and also manages plural virtual machines 20 developed on the physical machine 10 by using a virtualization software managing tool.

Figure 2:
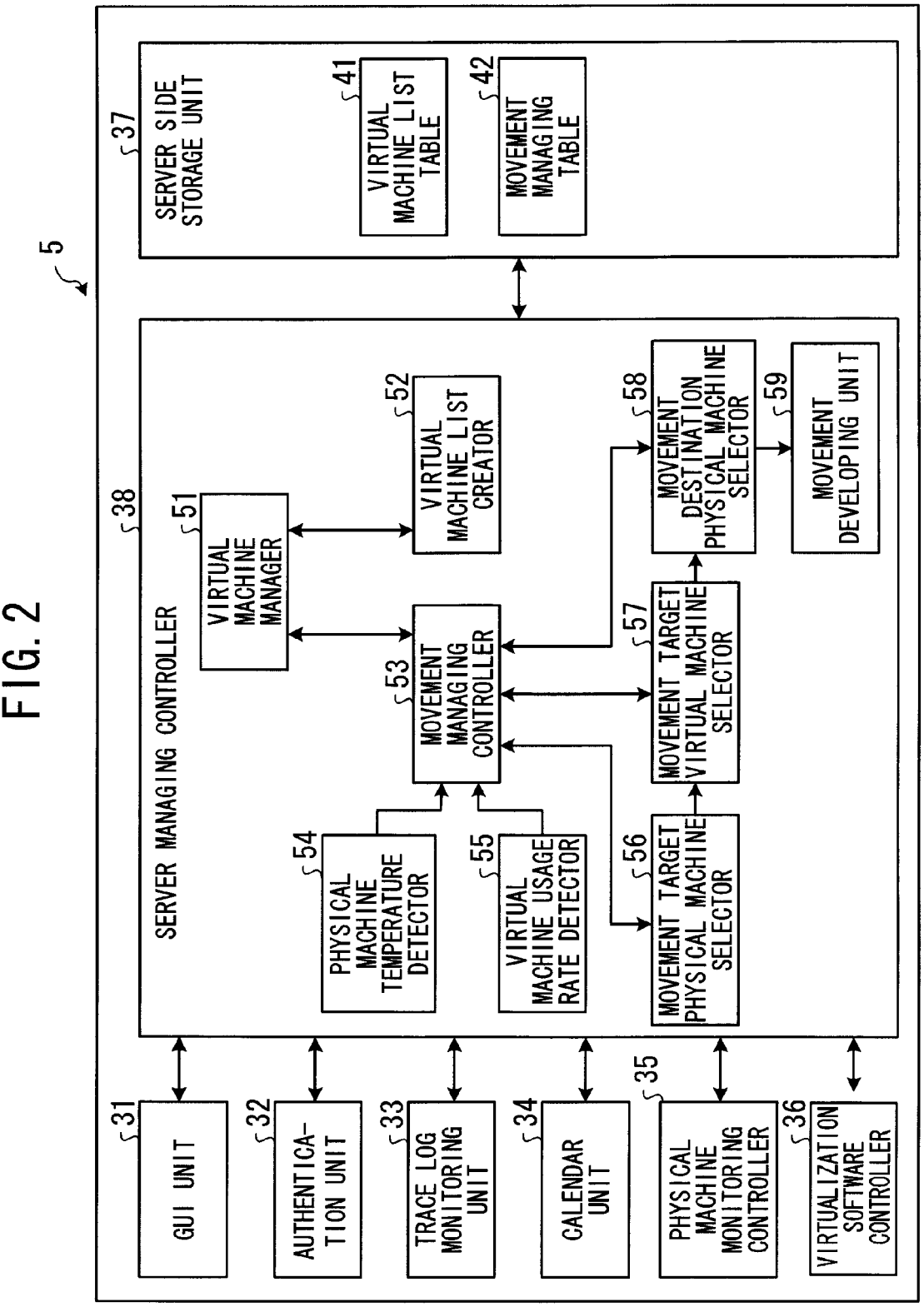
FIG. 2 is a block diagram illustrating the internal construction of a managing server which is a main part of the first embodiment.

FIG. 2 is a block diagram illustrating the internal construction of the managing server 5 which is a main part of the first embodiment.

The managing server 5 illustrated in FIG. 2 has a GUI (Graphical User Interface) unit 31 serving as a user interface with the client 6, an authenticating unit 32 for executing authentication processing in cooperation with the managing tool of the virtualization software, a trace log monitoring unit 33 for managing information collected when a trouble occurs and an operation record of audit trail, and a calendar unit 34 having a calendar function.

Furthermore, the managing server 5 has a physical machine monitoring controller 35 for monitoring and controlling plural physical machines 10, a virtualization software controller 36 for monitoring and controlling plural virtual machines developed on the physical machine 10 by using a managing tool of the virtualization software, a server side storage unit 37 for storing various kinds of information relating to the managing server 5, and a server managing controller 38 for controlling the overall managing server 5.

The server side storage unit 37 has a virtual machine list table 41 for managing virtual machines 20 developed on each physical machine 10 in a list style for every physical machine 10, and a movement managing table 42 for managing information relating to movement management of the virtual machines 20 for every physical machine 10 respectively.

For convenience of description, the description is made such that the physical machines 10 and the virtual machines 20 are managed in the virtual machine list table 41 and the movement managing table 42. However, the physical machines 10 and the virtual machines 20 are managed on the basis of physical machine identification information (PM) for identifying the physical machines 10 and virtual machine identification information (VM) for identifying the virtual machines 20.

The server managing controller 38 has a virtual machine manager 51 for managing virtual machines 20 developed on each physical machine 10 through the virtualization software controller 36, a virtual machine list creator 52 for creating a virtual machine list table 41, and a movement managing controller 53 for renewing and controlling the table content of the movement managing table 42 and also controlling movement management of the virtual machine 20 on the basis of the table content of the movement managing table 42.

The virtual machine list creator 52 collects management information of virtual machines 20 developed on a physical machine 10 according to the managing tool of the virtualization software through the virtualization software controller 36, and creates a virtual machine list table 41 for managing the virtual machines 20 developed on each physical machine 10 in a list style. The managing tool of the virtualization software periodically collects the management information of the virtual machines 20 developed on the physical machine 10.

FIG. 3 is a diagram illustrating the table content of the virtual machine list table 41 of the first embodiment.

The virtual machine list table 41 illustrated in FIG. 3 manages the identification information 41B of the virtual machines 20 developed on the physical machine 10 for every identification information 41A of the physical machine 10 in a list style. As a result, on the basis of the table content of the virtual machine list table 41, the server managing controller 38 can recognize that five virtual machines 20 of "VM11", "VM12", "VM 13", "VM15" and "VM 19" are being developed in the physical machine 10 of "PM01", and two virtual machines 20 of "VM22" and "VM26" are being developed in the physical machine 10 of "PMO2", for example.

FIG. 4 is a diagram illustrating the table content of the movement managing table 42 of the first embodiment.

The movement managing table 42 illustrated in FIG. 4 manages reference temperature information 42B representing reference temperature of CPU 11 of the physical machine 10, CPU environmental temperature information 42C representing present CPU environmental temperature of CPU 11, reference over-flag 42D representing whether the present CPU environmental temperature is above the reference temperature or not, movement target virtual machine information 42E representing a movement target virtual machine described later, and movement destination target physical machine information 42F representing movement destination target physical machine described later, for every identification information 42A of the physical machine 10. The reference temperature information 42B sets the reference temperature of a physical machine when the system is constructed for every physical machine 10.

The server managing controller 38 illustrated in FIG. 2 has a physical machine temperature detector 54 for detecting the present CPU environmental temperature through the physical machine monitoring controller 35 for every physical machine 10, and a virtual machine usage rate detector 55 for detecting the CPU usage rate through the virtualization software controller 36 for every virtual machine 20.

The physical machine temperature detector 54 successively collects the present CPU environmental temperature from the temperature detector 12 in the physical machine 10 through the physical machine monitoring controller 35 for every physical machine 10.

The virtual machine usage rate detector 55 successively collects the CPU usage rate of CPU 11 of the physical machine 10 required for the virtual machine 20 on which the virtual machine 20 is developed, according to the managing tool of the virtualization software through the virtualization software controller 36 for every virtual machine 20.

When detecting the present CPU environmental temperature of the physical machine 10 in the physical machine temperature detector 54, the movement managing controller 53 renews the present CPU environmental temperature in the CPU environmental temperature information 42C corresponding to the physical machine 10 in the movement managing table 42.

The server managing controller 38 illustrated in FIG. 2 has a movement target physical machine selector 56 for selecting a physical machine 10 as a movement target physical machine from plural physical machines 10 when the present CPU environmental temperature of the physical machine 10 concerned is above the reference temperature, and a movement target virtual machine selector 57 for selecting the virtual machine 20 that has the highest CPU usage rate as a movement target virtual machine.

The movement target physical machine selector 56 judges whether a physical machine 10 whose present CPU environmental temperature is above the reference temperature stored in the movement managing table 42 exists among the plural physical machines 10.

When there is a physical machine 10 whose present CPU environmental temperature is above the reference temperature, the movement target physical machine selector 56 selects the physical machine 10 as a movement target physical machine, representing that the virtual machine 20 being developed is moved and developed onto another physical machine 10.

Furthermore, when the movement target physical machine is selected in the movement target physical machine selector 56, the movement managing controller 53 controls the flag renewal process to erect the flag of the reference over the flag 42D corresponding to the physical machine 10 in the movement managing table 42.

The movement target virtual machine selector 57 selects a virtual machine having the highest CPU usage rate from among the virtual machines 20 developed onto the movement target physical machine, and selects the selected virtual machine 20 as a movement target virtual machine, representing that the selected virtual machine 20 is moved and developed onto another physical machine 10.

Furthermore, when the movement target virtual machine is selected by the movement target virtual machine selector 57, the movement managing controller 53 controls to renew the movement target virtual machine in the movement target virtual machine information 42E corresponding to the physical machine 10 in the movement managing table 42.

Furthermore, the server managing controller 38 illustrated in FIG. 2 has a movement destination physical machine selector 58 for selecting the optimum physical machine 10 from the plural physical machines 10 on the basis of the detection result of the physical machine temperature detector 54, and selecting the selected optimum physical machine as a movement destination target physical machine, which is a movement target of the movement target virtual machine. The server managing controller 38 also has a movement developing unit 59 for moving and developing the movement target virtual machine onto the selected movement destination target physical machine, when the movement destination target physical machine is selected in the movement destination physical machine selector 58.

The movement destination physical machine selector 58 selects the physical machine 10 having the lowest present CPU environmental temperature as the optimum physical machine 10 from the plural physical machines 10 on the basis of the detection result of the physical machine temperature detector 54, and selects the selected optimum physical machine 10 as the movement destination target physical machine as a movement destination of the movement target virtual machine.

Furthermore, when the movement destination target physical machine is selected by the movement destination physical machine selector 58, the movement managing controller 53 controls to identify the movement destination target physical machine in the movement destination target physical machine information 42F corresponding to the physical machine 10 in the movement managing table 42.

When the movement destination target physical machine is selected by the movement destination physical machine selector 58, the movement developing unit 59 moves and develops the movement target virtual machine onto the movement destination target physical machine according to the managing tool of the virtualization software through the virtualization software controller 36.

Figure 5:
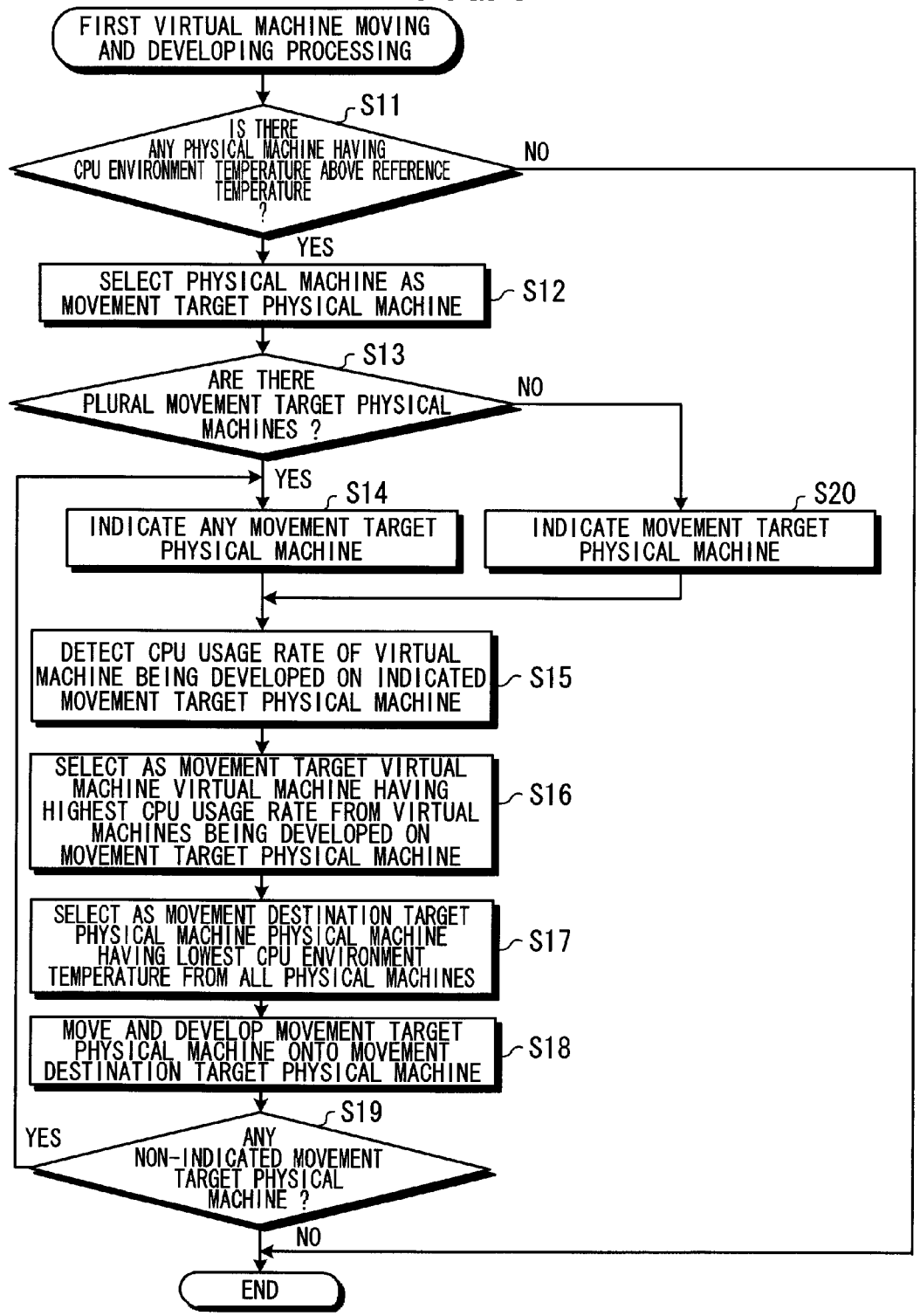
FIG. 5 is a flowchart illustrating the processing operation of the inside of a server managing controller in the managing server relating to first virtual machine moving and developing processing of the first embodiment.

Next, the operation of the virtual machine managing system of the first embodiment will be described. FIG. 5 is a flowchart illustrating the operation in the server managing controller 38 in the managing server 5 relating to the first virtual machine moving and developing process of the first embodiment.

According to the first virtual machine moving and developing processing illustrated in FIG. 5, when a physical machine 10 whose present CPU environmental temperature is above the reference temperature is selected from the plural physical machines 10, the virtual machine 20 having the highest CPU usage rate developed on the selected physical machine 10 is moved and developed onto another physical machine 10.

In FIG. 5, the movement target physical machine selector 56 in the server managing controller 38 judges on the basis of the reference temperature information 42B and the CPU environmental temperature information 42C in the movement managing table 42 whether there is any physical machine 10 whose present CPU environmental temperature is above the reference temperature (step S11).

When there is a physical machine whose present CPU environmental temperature is above the reference temperature (step S11; Yes), the movement target physical machine selector 56 selects the physical machine 10 concerned as a movement target physical machine (step S12). In the movement managing table 42 of FIG. 4, the reference temperature of the physical machine 10 of "PM02" is equal to 70° C. while the present CPU environmental temperature is equal to 75°, so that the physical machine 10 of "PM02" is selected as the movement target physical machine.

Furthermore, when the movement target physical machine was selected, the movement managing controller 53 executed the renewal control operation to erect a flag in the reference over-flag 42D corresponding to the movement target physical machine in the movement managing table 42.

The movement managing controller 53 judges whether plural movement target physical machines are selected in step S12 (step S13).

When plural movement target physical machines are selected (step S13; Yes), the movement managing controller 53 indicates any movement target physical machine out of the plural movement target physical machines (step S14), and detects the CPU usage rate of each virtual machine 20 being developed onto the movement target physical machine indicated through the virtual machine usage rate detector 55 (step S15).

When detecting the CPU usage rate of each virtual machine 20 developed onto the movement target physical machine, the movement target virtual machine selector 57 selects the virtual machine 20 having the highest CPU usage rate, and selects the selected virtual machine 20 as a movement target virtual machine (step S16).

When the movement target virtual machine is selected, the movement destination physical machine selector 58 selects the physical machine 10 having the lowest present CPU environmental temperature as a movement target physical machine on the basis of the CPU environmental temperature information 42C in the movement managing table 42 (step S17).

When the movement destination target physical machine is selected, the movement developing unit 59 moves and develops the movement target virtual machine selected in step S16 onto the movement destination target physical machine through the virtualization software controller 36 (step S18). When the movement and development of the movement target virtual machine onto the movement destination target physical machine is completed, the movement managing controller 53 executes renewal control to release the reference over-flag 42D in the movement managing table 42 corresponding to the movement target physical machine selected in step S12 and delete the content of the movement target virtual machine information 42E and the content of the movement destination target physical machine information 42F.

When the movement target virtual machine is moved and developed onto the movement destination target physical machine, the movement managing controller 53 judges whether there is any movement target physical machine which is not indicated in step S14 (step S19).

When there is any non-indicated movement target physical machine (step S19; Yes), the movement managing controller 53 shifts the process to the step S14 to indicate any non-indicated movement target physical machine out of the non-indicated movement target physical machines.

When there is no non-indicated movement target physical machine (step S19; No), the movement managing controller 53 finishes the operation of FIG. 5.

When there is no physical machine whose present CPU environmental temperature is above the reference temperature (step S11; No), the movement target physical machine selector 56 finishes the operation of FIG. 5.

When plural movement target physical machines do not exist(step S13; No), the movement managing controller 53 indicates the movement target physical machine (step S20), and shifts the process to step S15 to detect the CPU usage rate of each virtual machine 20 developed on the indicated movement target physical machine.

In the first virtual machine moving and developing process illustrated in FIG. 5, when the physical machine 10 whose CPU environmental temperature is above the reference temperature is selected from the plural physical machines 10, the selected physical machine 10 is selected as the movement target physical machine, and the virtual machine 20 having the highest CPU usage rate is selected as the movement target virtual machine from the virtual machines 20 developed on the selected movement target physical machine. The physical machine 10 having the lowest CPU usage rate is selected as the movement destination target physical machine from the plural physical machines 10, and the movement target virtual machine is moved and developed onto the selected movement destination target physical machine. As a result, according to the first virtual machine moving and developing process, the movement and development of the virtual machine 20 are performed in accordance with the system environment in consideration of the CPU usage rate and the CPU environmental temperature, whereby not only the physical machine 10, but also the virtual machine 20 can be stably operated.

In the first embodiment, when the physical machine 10 whose CPU environmental temperature is above the reference temperature is selected from the plural physical machine 10, the selected physical machines 10 is selected as the movement target physical machine, and the virtual machine 20 having the highest CPU usage rate is selected as the movement target virtual machine from the virtual machines 20 developed on the selected movement target physical machine. Then, the physical machine 10 having the lowest CPU environmental temperature is selected as the movement destination target physical machine from the plural physical machines 10, and the movement target virtual machine is moved and developed onto the selected movement destination target physical machine. As a result, according to the first embodiment, the movement and development of the virtual machine 20 are performed in accordance with the system environment in consideration of the CPU usage rate and the CPU environmental temperature, whereby not only the physical machine 10, but also the virtual machine 20 can be stably operated.

In the first embodiment, when the movement target virtual machine is selected, the physical machine 10 having the lowest CPU environmental temperature is selected as the movement destination target physical machine of the movement target virtual machine. However, the movement destination target physical machine may be also selected by the following method, and this method will be described as a second embodiment.

Second Embodiment

In a second embodiment, the same elements as the first embodiment are represented by the same reference numerals, and the duplicative descriptions of the construction and the operation are omitted from the following description.

Figure 6:
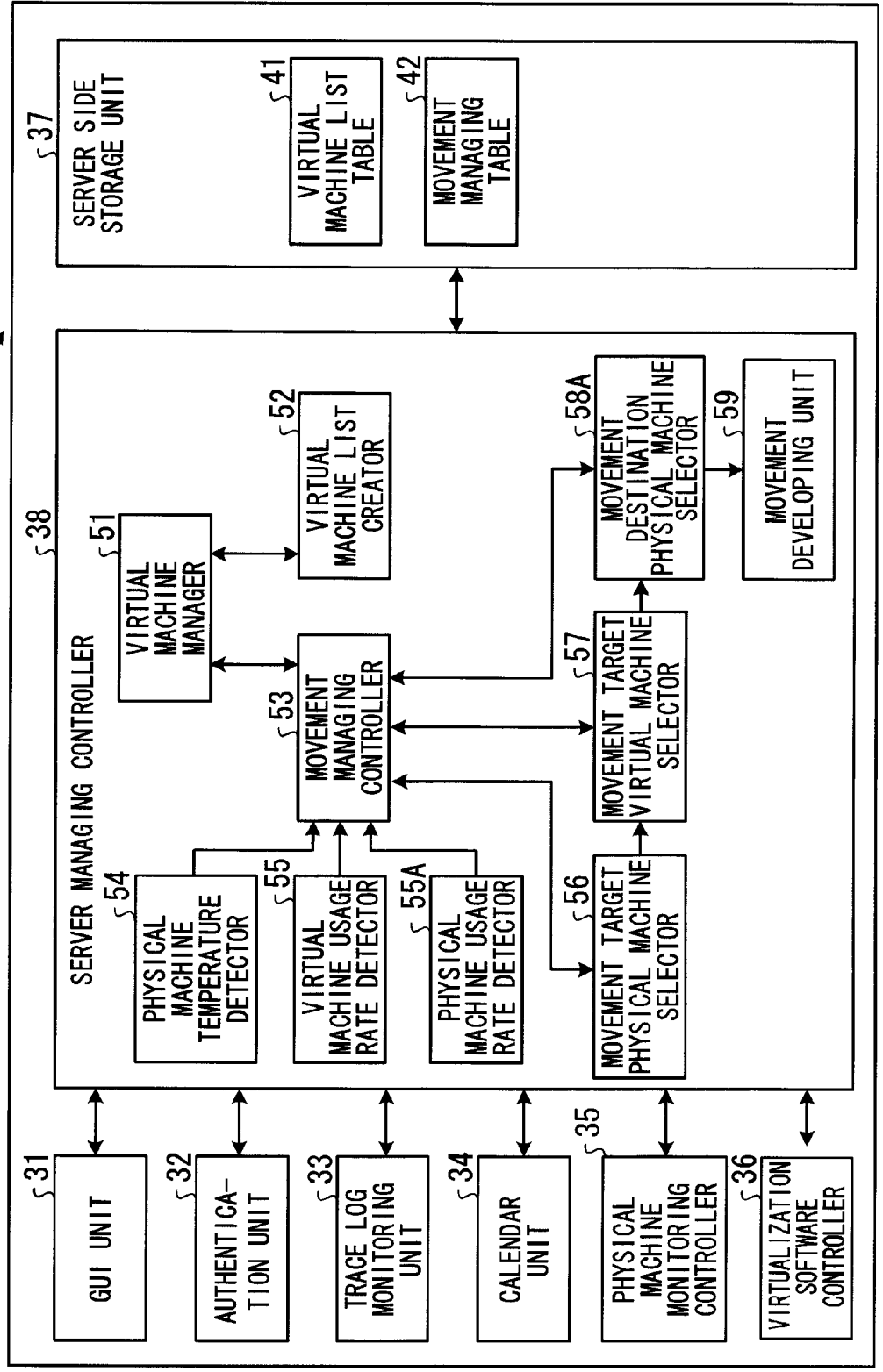
FIG. 6 is a block diagram illustrating the internal construction of the managing server which is a main part of a second embodiment.

FIG. 6 is a block diagram illustrating the internal construction of the managing server 5 which is a main part of the second embodiment.

The difference between the virtual machine managing system 1 of the first embodiment and the virtual machine managing system of the second embodiment resides in that the physical machine 10 having the lowest CPU usage rate among the plural physical machines 10 is selected as the movement destination target physical machine.

The server managing controller 38 in the managing server 5 illustrated in FIG. 6 has a physical machine usage rate detector 55A for detecting the CPU usage rate of the physical machine 10 itself through the physical machine monitoring controller 35 for every physical machine 10, and a movement destination physical machine selector 58A for selecting the physical machine 10 having the lowest CPU usage rate as the movement destination target physical machine on the basis of the detection result of the physical machine usage rate detector 55A.

Figure 7:
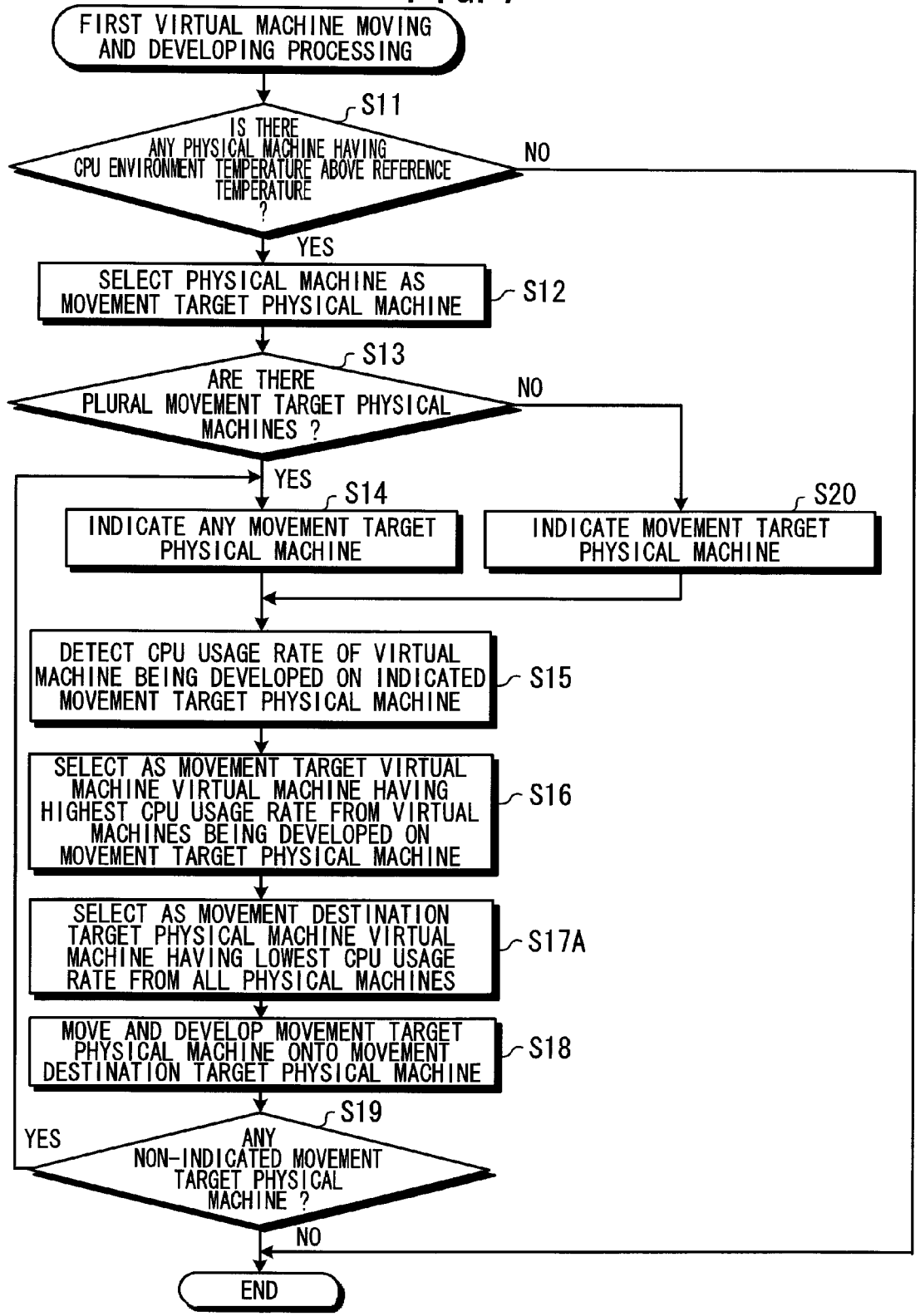
FIG. 7 is a flowchart illustrating the processing operation of the inside of a server managing controller in a managing server relating to second virtual machine moving and developing processing of the second embodiment.

FIG. 7 is a flowchart illustrating the operation of the server managing controller 38 in the server manager 5 associated with the second virtual machine moving and developing process of the second embodiment.

In FIG. 7, when the virtual machine 20 having the highest CPU usage rate as a movement target virtual machine from virtual machines 20 developed on a movement target physical machine is selected in step S16, the movement destination physical machine selector 58A selects the physical machine 10 having the lowest CPU usage rate from the plural physical machines 10 as a movement destination target physical machine and a movement destination of the movement target virtual machine (step S17A).

Then, when the movement destination physical machine is selected in step S17A, the moving and developing unit 59 moves and develops the movement target virtual machine onto the movement destination target physical machine in step S18, and shifts the process to step S19 to judge whether there is any non-indicated movement target physical machine.

In the second virtual machine moving and developing process illustrated in FIG. 7, when the physical machine whose CPU environmental temperature is above the reference temperature is selected from plural physical machines 10, the selected physical machine 10 is selected as a movement target physical machine, and the virtual machine 20 having the highest CPU usage rate is selected as a movement target virtual machine from virtual machines 20 developed on the selected movement target physical machine. Furthermore, the physical machine 10 having the lowest CPU usage rate is selected as a movement destination target physical machine from the plural physical machines 10, and the movement target virtual machine is moved and developed onto the selected movement destination target physical machine. As a result, according to the second virtual machine moving and developing process, the movement and development of the virtual machine 20 are performed in accordance with the system environment in consideration of the CPU usage rate and the CPU environmental temperature, whereby not only the physical machine 10, but also the virtual machine 20 can be stably operated.

In the second embodiment, when a physical machine 10 whose CPU environmental temperature is above the reference temperature is selected from plural physical machines 10, the selected physical machine 10 is selected as a movement target physical machine, and the virtual machine 20 having the highest CPU usage rate is selected as a movement target virtual machine from virtual machines 20 developed on the selected movement target physical machine. Then, the physical machine having the lowest CPU usage rate is selected as a movement destination target physical machine from the plural physical machines 10, and the movement target virtual machine is moved and developed onto the selected movement destination target physical machine. As a result, according to the second embodiment, the movement and development of the virtual machine 20 are performed in accordance with the system environment in consideration of the CPU usage rate and the CPU environmental temperature, whereby not only the physical machine 10, but also the virtual machine 20 can be stably operated.

In the first and second embodiments, the virtual machine 20 having the highest CPU usage rate is selected as the movement target virtual machine from the virtual machines 20 developed on the movement target physical machine in the movement target virtual machine selector 57 (see step 16 of FIGS. 5 and 7). However, the same effect can be obtained by selecting virtual machines having a predetermined CPU usage rate (calculator event reference level) or more are selected as movement target virtual machines from virtual machines 20 being developed on the movement target physical machine, for example.

Furthermore, in the first embodiment, the physical machine 10 having the lowest CPU environmental temperature is selected in the movement destination physical machine selector 58, but in the second embodiment, the physical machine 10 having the lowest CPU usage rate is selected in the movement destination physical machine selector 58A. However, for example, when the selecting condition of the movement destination physical machine selector 58 is set on the basis of the CPU environmental temperature and the CPU usage rate so that the physical machine 10 having the lowest CPU environmental temperature and the lowest CPU usage rate is selected as the movement destination target physical machine, the movement and development of the virtual machine 20 are performed in accordance with the system environment, whereby not only the physical machine 10, but also the virtual machine 20 can be more stably operated.

Furthermore, by paying attention to the physical arrangement of the physical machines 10 of the virtual machine managing system 1, for example, by paying attention to the fact that the CPU environmental temperature of the physical machine 10 adjacent to cooling facilities such as a cooler or the like is low, the physical machine 10 adjacent to the cooling facilities may be selected as the movement destination target physical machine.

Furthermore, in the first and second embodiments, the CPU environmental temperature of the physical machine 10 is adopted as the physical event, and the CPU environmental temperature is detected through the temperature detector 12 which is arranged so as to be adjacent to CPU 11. However, the internal temperature of a rack or housing in which the physical machine 10 is mounted may be adopted as the CPU environmental temperature.

In the first and second embodiments, the CPU environmental temperature of the physical machine is adopted as the physical event. The same effect can be obtained by adopting the power consumption amount of the physical machine 10 as the physical event.

Furthermore, in the first and second embodiments, the CPU environmental temperature of the physical machine 10 is adopted as the physical event. However, the combination of the CPU environmental temperature and the power consumption amount of the physical machine 10 may be set as the physical event. In this case, the movement target physical machine can be selected with higher precision.

In the second embodiment, the physical machine usage rate detector 55A for detecting the CPU usage rate of the physical machine 10 itself is provided. However, in place of the physical machine usage rate detector 55A, the CPU usage rates of all the virtual machines 20 developed on the physical machine 10 may be added for every physical machine 10 through the virtual machine usage rate detector 55, and the addition result may be adopted as the CPU usage rate of the physical machine 10 itself.

The scope of the technical idea of the present invention is not limited by the above embodiments, and various modifications and alterations may be made to the above embodiments without departing from the scope of the technical idea (subject matter) described in the claims. Furthermore, the effect of the present invention is not limited to the effects described with reference to the above embodiments.

Furthermore, all or some of the various kinds of processing which are described as being automatically executed in the above embodiments may be manually executed, and also all or some of the various kinds of processing which are described as being manually executed in the above embodiments may be automatically executed. Furthermore, the processing procedure, the control procedure, the specific title and information containing various kinds of data and parameters which are described with reference to the above embodiments may be properly changed unless specifically indicated.

Furthermore, the respective devices and the respective constituent elements illustrated in the figures are described functionally and conceptually, and they are not necessarily required to be constructed as illustrated, and the specific styles of the respective devices are not limited to those illustrated in the figures.

Furthermore, all or any part of the various kinds of processing executed by the respective devices may be executed on CPU (Central Processing Unit) (or a microcomputer such as MPU (Micro Processing Unit), MCU (Micro Controller Unit) or the like), on a program analyzed and executed by CPU (or microcomputer such as MPU, MCU or the like) or on hardware based on wire logic.

What is claimed is:

1. A non-transitory recording medium having a virtual machine managing program recorded therein, the program managing plural physical machines and executing on a computer to manage virtual machines developed on each physical machine and to execute:
   detecting a physical event of each of the physical machines;
   selecting a movement target physical machine from the plural physical machines based on a result of the detecting of the physical events;
   detecting calculator events of plural virtual machines developed on at least the selected movement target physical machine;
   selecting a movement target virtual machine from virtual machines developed on the selected movement target physical machine based on a result of the detecting of the calculator events;
   selecting a movement destination target physical machine from the plural physical machines based on a result of the detecting of the physical events; and
   controlling a movement of the selected movement target virtual machine based on the selected movement destination target physical machine;
   wherein the selected movement target physical machine has a control circuit for controlling the virtual machines developed on the selected movement target physical machine, and the detecting of the calculator event detects a usage rate of the control circuit during operation of the selected movement target physical machine as the calculator event of the selected movement target physical machine, and detects a usage rate of the control circuit during operation of the virtual machines as the calculator event of the virtual machines; and
   wherein the selecting of the movement target virtual machine selects the virtual machine that generates a highest use rate out of the use rates of the control circuit relating to the virtual machines developed on the movement target physical machine.

2. The recording medium having the virtual machine managing program recorded therein according to claim 1, wherein the controlling of the movement moves and develops the selected movement target virtual machine on the selected movement destination target physical machine.

3. The recording medium having the virtual machine managing program recorded therein according to claim 1, wherein the selecting of the movement target physical machine selects one of the physical machines in which the physical event of the one physical machine is above a physical event reference level.

4. The recording medium having the virtual machine managing program recorded therein according to claim 1, wherein the selecting of the movement target virtual machine selects one of the virtual machines which generates a highest calculator event out of the calculator events detected in the detecting of the calculator events.

5. The recording medium having the virtual machine managing program recorded therein according to claim 1, wherein the detecting of the physical event detects an environmental temperature of the control circuit as the physical event of the physical machines.

6. The recording medium having the virtual machine managing program recorded therein according to claim 5, wherein the selecting of the movement destination physical machine selects the physical machine including the control circuit in which the environmental temperature of the control circuit is the lowest environmental temperature among the control circuits of the plural physical machines.

7. The recording medium having the virtual machine managing program recorded therein according to claim 1, wherein the detecting of the physical event detects a power consumption amount on each physical machine as the physical event of the physical machines.

8. The recording medium having the virtual machine managing program recorded therein according to claim 1, wherein the selecting of the movement destination physical machine selects the physical machine including the control circuit in which the usage rate of the control circuit is the lowest usage rate among the control circuits of the plural physical machines.

9. A managing server device for managing plural physical machines and managing virtual machines developed on each physical machine, the managing server device comprising:
   a memory; and
   a processor that executes a program including a procedure, the procedure comprising:
      detecting a physical event of each of the physical machines;
      selecting a movement target physical machine from the plural physical machines based on a result of the detecting of the physical events;
      detecting calculator events of plural virtual machines developed on at least the selected movement target physical machine;
      selecting a movement target virtual machine from virtual machines developed on the selected movement target physical machine based on a result of the detecting of the calculator events;
      selecting a movement destination target physical machine from the plural physical machines based on a result of the detecting of the physical events; and
      controlling a movement of the selected movement target virtual machine based on the selected movement destination target physical machine;
   wherein the selected movement target physical machine has a control circuit for controlling the virtual machines developed on the selected movement target physical machine, and the detecting of the calculator event detects a usage rate of the control circuit during operation of the selected movement target physical machine as the calculator event of the selected movement target physical machine, and detects a usage rate of the control circuit during operation of the virtual machines as the calculator event of the virtual machines; and wherein the selecting of the movement target virtual machine selects the virtual machine that generates a highest usage rate out of the usage rates of the control circuit associated with the virtual machines developed on the movement target physical machine.

10. The managing server device according to claim 9, wherein the controlling of the movement moves and develops the selected movement target virtual machine on the selected movement destination target physical machine.

11. The managing server device according to claim 9, wherein the selecting of the movement target physical machine selects one of the physical machines in which the physical event of the one physical machine is above a physical event reference level.

12. The managing server device according to claim 9, wherein the selecting of the movement target virtual machine selects one of the virtual machines which generates a highest calculator event out of the calculator events detected in the detecting of the calculator events.

13. The managing server device according to claim 9, the detecting of the physical event detects environmental temperature of the control circuit as the physical event of the physical machines.

14. The managing server device according to claim 9, wherein the detecting of the physical event detects a power consumption amount of each physical machine as the physical event of the physical machines.

15. A virtual machine managing method for managing plural physical machines and managing virtual machines developed on each physical machine, the virtual machine managing method comprising:

detecting a physical event of the physical machine;

selecting a movement target physical machine from the plural physical machines based on a result of the detecting of the physical event;

detecting calculator events of plural virtual machines developed on at least the selected movement target physical machine;

selecting a movement target virtual machine from the virtual machines developed on the selected movement target physical machine based on a result of the detecting of the calculator event;

selecting a movement destination target physical machine from the plural physical machines based on a result of the detecting of the physical event; and controlling a movement of the selected movement target virtual machine based on the selected movement destination target physical machine;

wherein the selected movement target physical machine has a control circuit for controlling the virtual machines developed on the selected movement target physical machine, and the detecting of the calculator event detects a usage rate of the control circuit during operation of the selected movement target physical machine as the calculator event of the selected movement target physical machine, and detects a usage rate of the control circuit during operation of the virtual machines as the calculator event of the virtual machines; and wherein the selecting of the movement target virtual machine selects the virtual machine that generates a highest use rate out of the use rates of the control circuit relating to the virtual machines developed on the movement target physical machine.

16. The virtual machine managing method according to claim 15, wherein the controlling of the movement moves and develops the selected movement target virtual machine on the selected movement destination target physical machine.

* * * * *